UNITED STATES PATENT OFFICE.

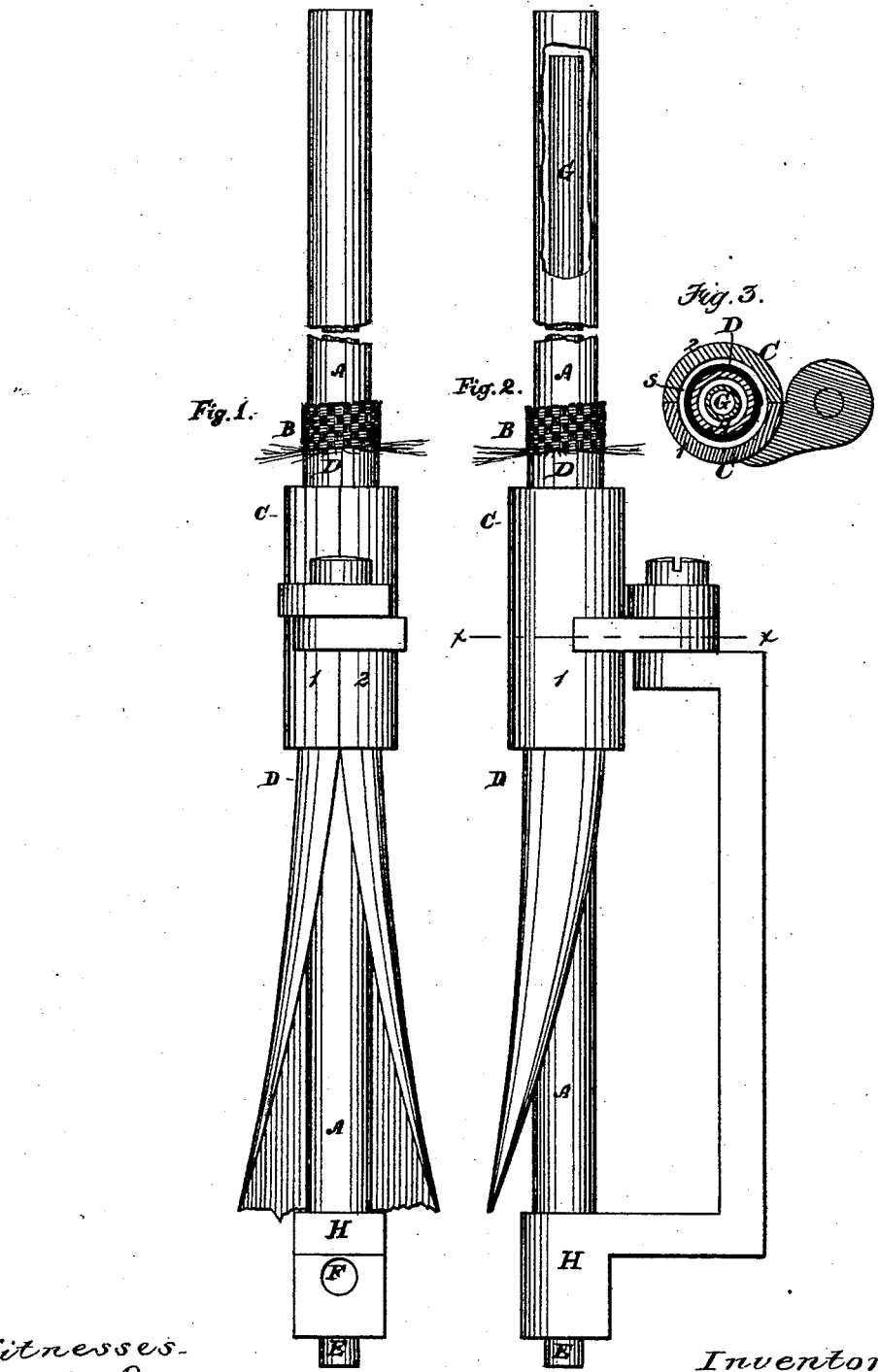

CHESTER P. MARSHALL, OF WORCESTER, ASSIGNOR TO E. B. WELCH, OF CAMBRIDGE, MASSACHUSETTS.

IMPROVEMENT IN PROCESSES OF LINING TUBULAR FABRICS WITH RUBBER.

Specification forming part of Letters Patent No. 212,026, dated February 4, 1879; application filed April 5, 1878.

*To all whom it may concern:*

Be it known that I, CHESTER P. MARSHALL, of Worcester, in the county of Worcester and State of Massachusetts, have invented certain Improvements in Processes for Lining Tubular Fabrics with Rubber, of which the following is a specification:

This invention relates to the operation of lining tubular textile fabrics with rubber in the manufacture of hose for conducting water or other liquids.

In the manufacture of rubber-lined hose the rubber employed is of such a nature that when placed in contact with the textile fabric and properly heated it will soften to such a degree that it will adhere closely to the fabric. It is therefore necessary to employ heat in order to effect a union between the rubber and the fabric, and this heating which the rubber receives partially hardens or vulcanizes the same and renders it more durable. Heretofore the rubber has been introduced into the fabric after the latter has been completely woven, and then heated by steam admitted directly into the fabric inside of the lining. This method is objectionable for the following reasons: first, the rubber lining has to be introduced in short lengths, so that frequent joints or breaks are formed, which are liable to cause leakage; second, the lining, being placed loosely in the fabric, can only be pressed outwardly against the inner surface thereof by the pressure of the steam, which pressure, when the steam is at the temperature required to properly heat the rubber without melting the same, is not sufficient to effect the desired union between the fabric and the rubber.

My invention has for its object to effect certain improvements in the process of lining tubular fabrics with rubber, whereby the lining can be applied continuously without transverse breaks or joints, and is more firmly united to the fabric than heretofore.

To this end the invention consists in weaving the tubular fabric upon the rubber lining while the latter is in a heated condition and rigidly supported, as on a heated mandrel.

It also consists in the means employed for heating and supporting the rubber lining and the fabric, and for imparting a tubular shape to the rubber before the fabric is woven thereon, all of which I will now proceed to describe.

In the drawings forming a part of this specification, Figure 1 represents a front view of the mechanism which I prefer to employ for heating, supporting, and imparting a tubular shape to the rubber lining. Fig. 2 represents a side view of the same with a portion of the arbor broken away. Fig. 3 represents a section on line $x\ x$, Fig. 2.

Similar letters of reference indicate corresponding parts.

In carrying out my invention I employ a stationary mandrel, A, which is of cylindrical and preferably tubular form, and of any desired length, and is preferably located in a vertical position. This mandrel constitutes the support for the rubber lining and the tubular fabric which is woven thereon, as will be described, and is adapted to be heated in any desired manner, preferably by a steam-pipe, G, entering its lower end and terminating near its upper end, as shown in Fig. 2, the upper end of the pipe G being open, so that steam passing into the same at E will be discharged at the upper end into the mandrel, and will return through the mandrel to an escape-opening, F, at the lower end. In connection with the mandrel I employ a loom of any suitable construction adapted to weave a tubular fabric upon such mandrel, the latter being located in the proper relation to the loom, so that the fabric will be woven with its warp-threads extending longitudinally of the mandrel, and its woof-threads winding spirally around the same.

D represents the rubber strip which constitutes the lining for the tubular fabric. This strip is of indefinite length, and of such width that it will entirely inclose the mandrel and form a tube having an internal diameter equal to the external diameter of said mandrel.

Before commencing the weaving operation I suitably secure the end of the strip D to the mandrel, so as to form the commencement of a tube at or above the point where the warp and woof threads are interwoven on the mandrel to form the tubular fabric. I then set the loom in operation, weaving the fabric into the lining D, as shown at B, Figs. 1 and 2, the rubber being softened by the heat from the mandrel, so that the threads of the fabric are embedded in the rubber as they are interwoven. The rubber is rigidly backed or supported in a tubular form by the mandrel, so that the tubular lining cannot be collapsed or contracted by the pressure of the threads upon its outer surface. As the weaving proceeds, the fabric and its lining are moved up the mandrel by any suitable automatic or other mechanism provided for the purpose.

The rubber D is faced with cloth or other suitable material on its inner side, so that it will not adhere to the mandrel.

The sheet D is formed into a tube around the mandrel by any suitable means below the point where the weaving takes place. I prefer to employ for this purpose a sleeve, C, which surrounds the mandrel below the point where the weaving is effected, as shown in Figs. 1 and 2, and is entirely separated from the mandrel by an annular space, s. (Shown in Fig. 3.) This space is of sufficient width to receive the lining D and form the same into a tube, as shown in Fig. 3.

The sleeve C is preferably divided longitudinally into two parts, 1 and 2, the part 1 being rigidly attached to a suitable rigid support, H, and the part 2 being hinged to said support, so that the sleeve may be opened to enable the lining D to be interposed between the mandrel and sleeve.

From the foregoing it will be seen that a very secure and durable union is effected between the tubular fabric and its lining by my improved process, and that the lining can be applied in a single strip or piece of the same length as the fabric produced, thus avoiding any transverse joints or breaks in the lining.

The lining may be arranged in the form of a roll conveniently located with reference to the mandrel.

By lining the fabric and vulcanizing or heating the lining simultaneously with the weaving, I effect a marked saving of time and expense in the cost of manufacture, (avoiding a separate operation for heating or vulcanizing,) besides producing a better and more durable article of rubber-lined tubular fabric or hose than by any method heretofore used, so far as I am aware.

I claim as my invention—

1. The process herein described for lining tubular textile fabrics with rubber, consisting in heating and rigidly supporting said rubber lining in a tubular form, and weaving the tubular fabric upon the lining while the latter is so heated and supported, as set forth.

2. The combination of the mandrel A, adapted to be heated, and the sleeve C, inclosing said mandrel, and separated therefrom by an annular space, s, substantially as and for the purpose specified.

In testimony whereof I have signed my name to this specification in the presence of two subscribing witnesses.

CHESTER P. MARSHALL.

Witnesses:
E. B. WELCH,
C. F. BROWN.